(12) United States Patent
Eschbach et al.

(10) Patent No.: US 7,539,341 B2
(45) Date of Patent: May 26, 2009

(54) SYSTEMS AND METHODS FOR PROCESSING IMAGE DATA PRIOR TO COMPRESSION

(75) Inventors: Reiner Eschbach, Webster, NY (US); Emil V. Rainero, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 654 days.

(21) Appl. No.: 10/901,333

(22) Filed: Jul. 29, 2004

(65) Prior Publication Data
US 2006/0023960 A1 Feb. 2, 2006

(51) Int. Cl.
G06F 15/16 (2006.01)
G06K 9/00 (2006.01)
G06K 9/36 (2006.01)
G06K 9/40 (2006.01)

(52) U.S. Cl. ........................ 382/166; 382/239; 382/254; 709/247; 709/203

(58) Field of Classification Search ................. 382/254, 382/162, 166, 239; 709/247, 202, 203; 715/526; 345/864

See application file for complete search history.

(56) References Cited

U.S. PATENT DOCUMENTS

| | | | |
|---|---|---|---|
| 5,157,740 A | 10/1992 | Klein et al. | |
| 5,210,824 A | 5/1993 | Putz et al. | |
| 5,450,502 A | 9/1995 | Eschbach et al. | |
| 5,581,370 A | 12/1996 | Fuss et al. | |
| 5,703,965 A | 12/1997 | Fu et al. | |
| 5,872,569 A | 2/1999 | Salgado et al. | |
| 5,883,979 A * | 3/1999 | Beretta et al. ............... | 382/251 |
| 5,963,201 A | 10/1999 | McGreggor et al. | |
| 5,991,445 A * | 11/1999 | Kato ........................... | 382/232 |
| 6,128,021 A | 10/2000 | Van der Meulen et al. | |
| 6,175,427 B1 | 1/2001 | Lehmbeck et al. | |
| 6,222,642 B1 | 4/2001 | Farrell et al. | |
| 6,240,215 B1 | 5/2001 | Salgado et al. | |
| 6,314,452 B1 * | 11/2001 | Dekel et al. .................. | 709/203 |
| 6,345,128 B1 * | 2/2002 | Stokes ......................... | 382/254 |
| 6,449,639 B1 | 9/2002 | Blumberg | |
| 6,456,340 B1 | 9/2002 | Margulis | |
| 6,469,805 B1 | 10/2002 | Behlok | |
| 6,484,631 B2 | 11/2002 | Degani et al. | |
| 6,501,472 B1 | 12/2002 | Hunt et al. | |
| 6,539,547 B2 | 3/2003 | Driscoll, Jr. et al. | |
| 6,594,687 B1 | 7/2003 | Yap et al. | |
| 6,606,418 B2 | 8/2003 | Mitchell et al. | |
| 6,618,171 B1 | 9/2003 | Tse et al. | |

(Continued)

FOREIGN PATENT DOCUMENTS

GB 2 343 807 A 5/2000

(Continued)

OTHER PUBLICATIONS

Sachin Deshpande et al., "Http Streaming of JPEG2000 Images", IEEE XP-002193324, 2001, pp. 15-19.

(Continued)

Primary Examiner—Jingge Wu
Assistant Examiner—Andrae S Allison
(74) Attorney, Agent, or Firm—Oliff & Berridge, PLC

(57) ABSTRACT

Systems and methods provide data processing before data compression. The data processing includes contrast enhancement and/or custom color mapping.

34 Claims, 6 Drawing Sheets

U.S. PATENT DOCUMENTS

| | | |
|---|---|---|
| 6,708,309 B1 | 3/2004 | Blumberg |
| 6,744,927 B1 * | 6/2004 | Kato ........................... 382/239 |
| 6,754,231 B1 * | 6/2004 | Jonsson et al. .............. 370/474 |
| 6,826,310 B2 * | 11/2004 | Trifonov et al. ............. 382/274 |
| 6,874,131 B2 | 3/2005 | Blumberg |
| 6,944,357 B2 * | 9/2005 | Bossut et al. ............... 382/298 |
| 6,963,668 B2 * | 11/2005 | Engeldrum et al. ......... 382/233 |
| 6,970,602 B1 * | 11/2005 | Smith et al. ................. 382/232 |
| 6,983,083 B2 * | 1/2006 | Fedorovskaya et al. ..... 382/286 |
| 7,065,255 B2 | 6/2006 | Chen et al. |
| 7,218,789 B2 | 5/2007 | Faber et al. |
| 2001/0035979 A1 | 11/2001 | Pornbacher |
| 2002/0056010 A1 | 5/2002 | Lincoln et al. |
| 2002/0085233 A1 | 7/2002 | Degani et al. |
| 2002/0087728 A1 | 7/2002 | Deshpande et al. |
| 2002/0107988 A1 | 8/2002 | Jordan |
| 2002/0112114 A1 | 8/2002 | Blair et al. |
| 2003/0018818 A1 | 1/2003 | Boliek et al. |
| 2003/0053690 A1 | 3/2003 | Trifonov et al. |
| 2003/0135649 A1 * | 7/2003 | Buckley et al. ............. 709/247 |
| 2004/0045030 A1 | 3/2004 | Reynolds et al. |
| 2004/0146206 A1 | 7/2004 | Matsubara |
| 2005/0125352 A1 | 6/2005 | Hirst |
| 2005/0188112 A1 | 8/2005 | Desai et al. |
| 2005/0244060 A1 | 11/2005 | Nagarajan et al. |
| 2005/0271283 A1 | 12/2005 | Dekel et al. |

FOREIGN PATENT DOCUMENTS

| | | |
|---|---|---|
| WO | WO 00/24188 | 4/2000 |
| WO | WO 00/72517 | 11/2000 |
| WO | WO 00/75859 A1 | 12/2000 |
| WO | WO 00/77741 A1 | 12/2000 |
| WO | WO 01/54397 A2 | 7/2001 |
| WO | WO 01/63558 A2 | 8/2001 |

OTHER PUBLICATIONS

Allen Pulsifer, "JPEG 2000 Has Arrived", Advanced Imaging, May 2001, 4 pages.
Steve Putz, "Design and Implementation of the System 33 Document Service", Xerox Corporation.
U.S. Appl. No. 10/901,241; Jul. 29, 2004; Rainero et al.
U.S. Appl. No. 10/901,240; Jul. 29, 2004; Eschbach et al.

* cited by examiner

SYSTEMS AND METHODS FOR PROCESSING IMAGE DATA PRIOR TO COMPRESSION

BACKGROUND OF THE INVENTION

1. Field of Invention

This invention relates to systems and methods for processing image data prior to compression.

2. Description of Related Art

Data compression is often desirable for speedy data transmission. The compression incorporated normally exploits redundancy in the data to encode represent the input data with fewer bits. In imaging applications, an additional degree of freedom can be utilized as the final use of the data is for the visual inspection of a human. The transmitted data thus has to be visually correct, rather than bitwise correct with the input data. This is commonly used in image compression methods. Additionally, it has to be appreciated that the actual display size of an image has a strong interaction with the perceived contrast of the image by a human observer and that at different size levels, different contrast levels are preferred or desired. For example, a common image format is graphics interchange format (GIF). The graphics interchange format is a color mapped 8-bit/pixel format that embeds a predictive lossless coding as part of the file format.

A basic feature of the predictive lossless coding is that future data is predicted based on past data and that the result of the prediction is an intermediate data that will be compressed. Here, advantage is taken from the fact that good predictions, e.g., for highly correlated data, will often cause a zero prediction error. This leads to large sections of zeros in the intermediate data and thus to a better compression. It should be noted that we use "zeros" and "correlated" interchangeably in the subsequent sections.

Regardless of its quality and advantages/disadvantages, the graphics interchange format is the most common browser supported image file format. It is the format of choice for many devices for color images, since it can be understood by virtually all clients without any additional software installed. Here and in the future we will use GIF to represent all data formats that incorporate a reduced color set and lossless or quasi-lossless compression and are supported by common browsing clients.

SUMMARY OF THE INVENTION

As outlined in co-pending application Ser. Nos. 10/901, 240 and 10/901,241, it is often advantageous if only the currently visible or currently desired portion of an image file is presented to the client. For example, a patent document might contain in excess of 1 MB of data in a standard document format, e.g., U.S. Pat. No. 6,285,462, whereas individual pages or sections of the same document can be represented with much less data. For text and standard document images, such as, for example, Power Point™ presentation, the default compression of the GIF format is often sufficient for wireless client applications. For example, an image of 240× 320 color pixels is compressed to approximately 5 kB. On the other hand, for scanned data or image intensive documents, the size of the compressed data is much larger. In the example of the image of 240×320 color pixels, the size of the compressed data is increased to approximately 30 kB. This increase in the size of the compressed data reduces the compression ratio, and increases data transmission time. It should be understood that networks will get faster, but that simultaneously display sixe and quality will also go up and that compression of image data will thus continue to be of interest.

Existing data compression algorithms are difficult to change to accommodate different types of data, rendering it difficult to increase data compression ratio. For example, the compression of the GIF format is performed by lossless compression. No changes to the compression algorithm can be made to influence the compression ratio in this scenario.

This invention provides systems and methods for increasing data compression ratio.

This invention separately provides systems and methods for processing data prior to data compression.

In various exemplary embodiments, this invention provides systems and methods for processing data with data contrasts enhancement.

In various exemplary embodiments, this invention provides systems and methods for processing data with custom color mapping.

In various exemplary embodiments, this invention provides systems and methods for processing data based on dynamically selected parameters associated with data compression or data transmission.

In various exemplary embodiments, this invention provides systems and methods for processing data to be transmitted through a wireless network.

In various exemplary embodiments, this invention provides systems and methods for processing data to be compressed for view on an Internet web site.

In various exemplary embodiments, this invention provides systems and methods for processing data to be transmitted to a handheld computing device.

In various exemplary embodiments, this invention provides systems and methods for processing data in GIF format.

In various exemplary embodiments, this invention provides systems and methods for processing data with parameters selected based at least on the bandwidth or transmission speed of a network, a zoom level, or a desired compressed image size.

In various exemplary embodiments, this invention provides systems and methods for processing data using tonal reproduction curves (TRC).

In various exemplary embodiments, this invention provides systems and methods for processing data with enhanced data contrasts to provide large correlated areas in the image and thus large areas of zeros in the data to increase data compression ratio in subsequent data compression.

In various exemplary embodiments, this invention provides systems and methods for processing data with a reduced number of color levels to increase the compression ratio in subsequent data compression.

In various exemplary embodiments, this invention provides systems and methods for processing data based on color quantization defined by a server or a user.

In various exemplary embodiments, this invention provides systems and methods for processing data by switching the data into black and white mode.

In various exemplary embodiments, the systems and methods according to this invention allow the server to process image data before compressing to the GIF data for transmission. The processing includes at least one of enhancing data contrasts to create large area of zeros in the data and using custom color map to reduce the number of color levels in the data, based on parameters dynamically created or selected based on the bandwidth or transmission speed of a network, a desired zoom level, or an appropriate compressed image size.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of the systems and methods of this invention will be described in detail, with reference to the following figures, wherein.

DETAILED DESCRIPTION OF EXEMPLARY EMBODIMENTS

Figure 1:
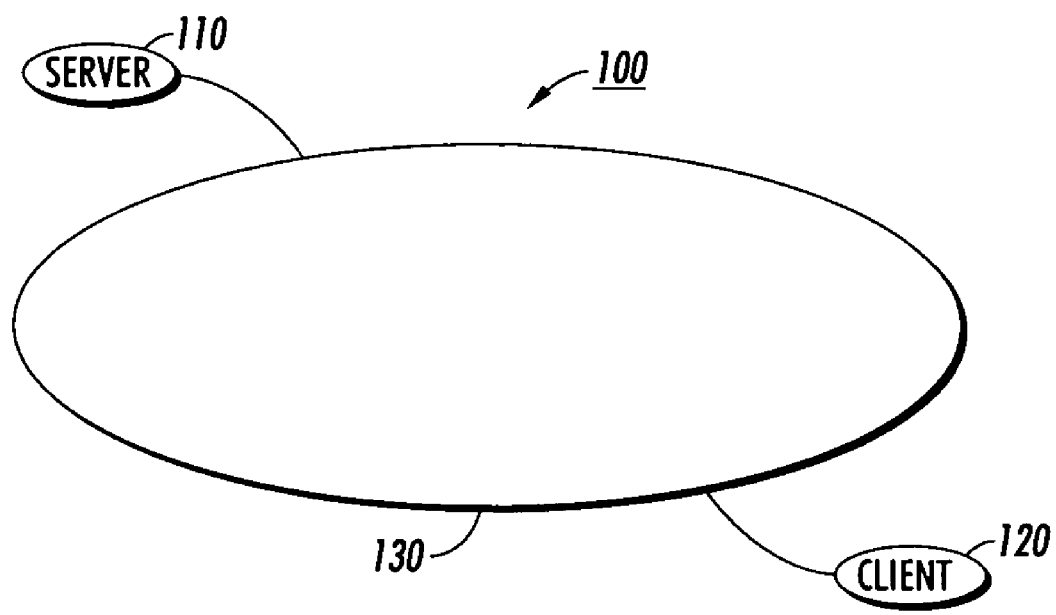
FIG. 1 illustrates an exemplary embodiment of a network for data transmission according to this invention.

FIG. 1 illustrates an exemplary embodiment of a data transmission system 100 associated with data processing according to this invention. As shown in FIG. 1, the data transmission system 100 includes one or more servers 110 connected to one or more clients 120 via one or more networks 130.

The server 110 provides compressed data and transmits the compressed data to the client 120 by way of the network 130. In various exemplary embodiments, the server 110 receives requests from the client 120 for compressed data.

The server 110 processes data before compressing the data. In various exemplary embodiments, the server 110 processes the data based on a selection of parameters prestored at the server 110 regarding the capabilities or requirements of the client 120 and the network 130. In various other exemplary embodiments, the server 110 processes the data based on the selection of parameters detected from the client 120, the network 130, or a combination thereof. In various other exemplary embodiments, the server 110 receives the selection of parameters sent from the client 120.

In various exemplary embodiments, the server 110 processes the data using tonal reproduction curves (TRC) and/or custom color maps. The server 110 is generally associated with a computer, as described in greater detail below in connection with FIG. 6.

The data to be processed contains one or more data values and/or one or more color levels. The processed data may be subsequently compressed and/or transmitted. In various exemplary embodiments, during a procedure where an image turns into a processed image, which then turns into data that subsequently turns into GIF data, the GIF data is the output data that is processed according to these exemplary embodiments.

The client 120 is a device that can display a form of the compressed image data. The client 120 receives the compressed image data from the server 110 via the network 130. In various exemplary embodiments, the client 120 sends a request for the image data to the server 110 before receiving the compressed data. In various exemplary embodiments, the client 120 selects and sends one or more parameters to the server 110 as a condition for the server 110 to process the data before compressing the data.

In various exemplary embodiments, the client 120 is a mobile device, such as a laptop computer, a personal data assistant (PDA), a cellular phone or other handheld computing device or the like. In various other exemplary embodiments, the client 120 is a standalone device such as a desktop computer.

The network 130 transmits data, requests or other information between the server 110 and the client 120. In various exemplary embodiments, the network 130 is a wired network. In various other exemplary embodiments, the network 130 is a wireless network. In various other exemplary embodiments, the network 130 includes both wired and wireless networks. In various exemplary embodiments, the network 130 includes the Internet. A user may view compressed data on a web page displayed on the client 120. In various other exemplary embodiments, the network 130 includes a wireless cellular phone network or any other existing or yet to be invented communication network. A user may view the compressed data displayed on a cellular phone at the client 120.

Figure 2:
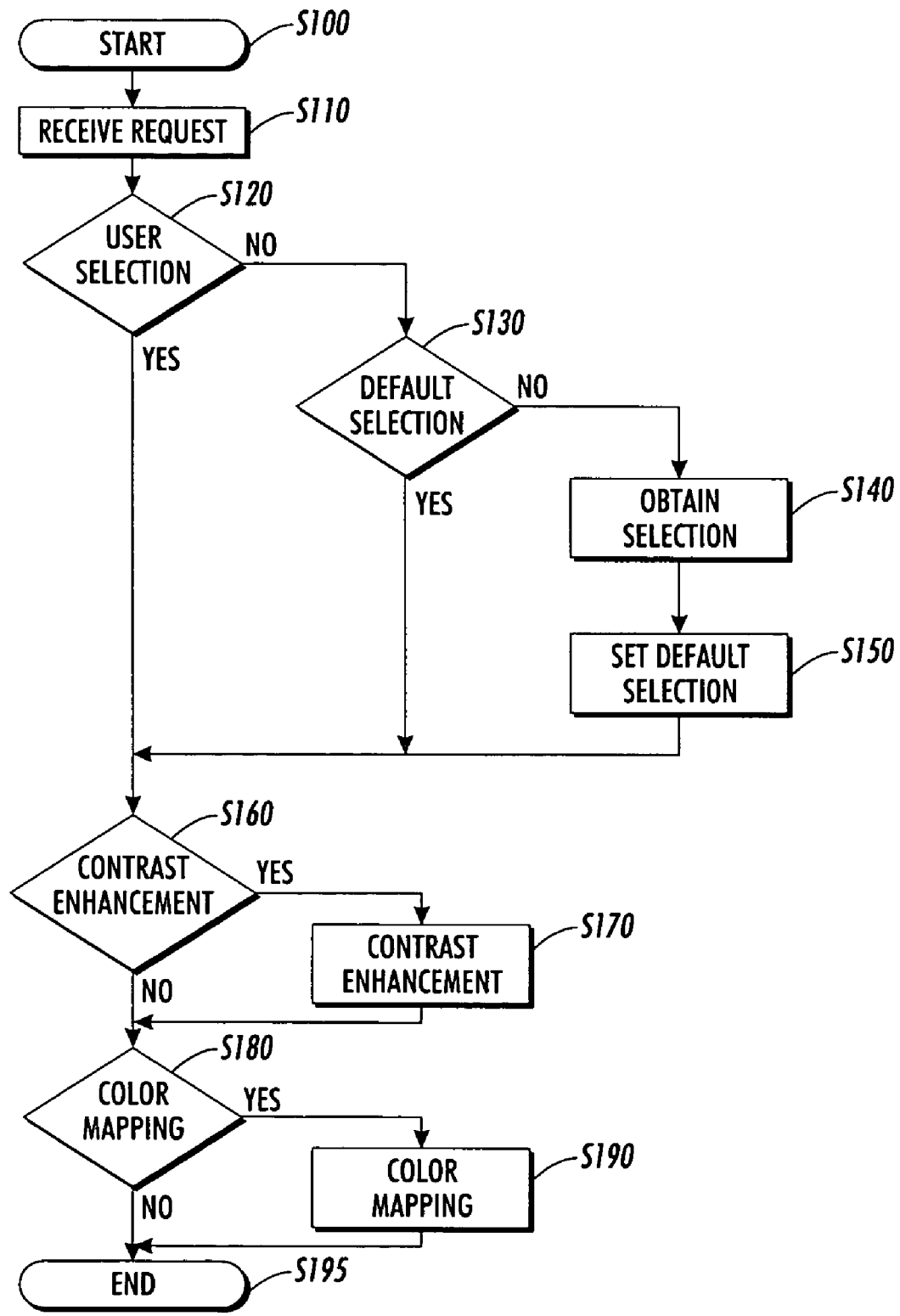
FIG. 2 is a flowchart outlining one exemplary embodiment of a method for processing data according to this invention.

FIG. 2 is a flowchart outlining an exemplary embodiment of a method for processing data according to this invention. As shown in FIG. 2, beginning in step S100, operation of the method continues to step S110, where a server receives a request for compressed data from a client via a network. In various exemplary embodiments, the request is a signal generated when a user clicks an icon displayed at the client. The icon represents data to be compressed as the user desires.

Next, in step S120, a determination is made whether a selection of parameters for processing data is received. In various exemplary embodiments, the server determines whether the user has provided the capacities of the client and/or the network, a zoom level, and/or a size of the compressed data. In various exemplary embodiments, the selected capacities of the network includes the transmission bandwidth or transmission speed of the network. In various exemplary embodiments, the data to be compressed is graphics interchange format (GIF) data.

If it is determined at step S120 that the user provided a selection of parameters, operation continues to step S160. On the other hand, if it is determined at step S120 that the user did not provide a selection of parameters, operation proceeds to step S130.

In step S130, a determination is made whether a default selection of parameters is available for processing the data. In various exemplary embodiments, a default selection of parameters for processing data may be pre-stored for pre-identified clients connected to a server via a known network. In various other exemplary embodiments, a default selection of parameters is not pre-stored, and detection of the features of the client and the network may be necessary in establishing a selection of parameters.

If it is determined at step S130 that a default selection of parameters for processing data is available, operation continues to step S160. On the other hand, if it is determined at step S130 that a default selection of parameters is not available, operation proceeds to step S140.

At step S140, a selection of parameters is established. In various exemplary embodiments, the selection of parameters is established based on data compression, data display, data transmission, or a combination thereof. In various exemplary embodiments, the selection of parameters is established based on the features of the client and the network, such as the transmission bandwidth or transmission speed of the network, a zoom level desired by the client, or a desired size of compressed data. In various exemplary embodiments, this information is detected by the server from the client or the network. In various other exemplary embodiments, the selection of the parameters is established using information provided by the client. Alternatively, the selection of the parameters is a combination of information detected by the server and the information provided by client. Next, in step S150, the selection of parameters established at step S140 is stored as the default selection of parameters. Operation then proceeds to step S160.

In step S160, a determination is made, based on the selection of parameters, whether image contrast enhancement is needed. In various exemplary embodiments, contrast enhancement is desirable for GIF image data. However, when the selection of parameters requires a display of a detailed image of the GIF image data, contrast enhancement may not be needed. In various exemplary embodiments, the contrast enhancement is realized by using tonal reproduction curves (TRC), as described in greater detail below. In step S160, the decision for contrast enhancement may be a function of one or more of zoom level, i.e., the size the image will be viewed at, compression ratio/bandwith, document type.

If it is determined at step S160 that no contrast enhancement is necessary, operation continues to step S180. This situation might likely be encountered if the image is viewed at the correct zoom level and that increased compression is not desired. On the other hand, if it is determined at step S160 that contrast enhancement is needed, operation proceeds to step S170.

In step S170, contrast enhancement is performed. Operation then proceeds to step S180.

In step S180, a determination is made based on the selection of parameters whether color mapping is needed. In various exemplary embodiments, a custom color map is used for color mapping to reduce the number of color levels. The custom color map is used to increase data compression ratio in subsequent data compression, as discussed in greater detail below. However, custom color mapping may not be necessary if the selection of parameters indicates that compression requirements are met.

If it is determined at step S180 that custom color mapping is not necessary, operation continues to step S195. On the other hand, if it is determined at step S180 that custom color mapping is needed, operation proceeds to step S190.

In step S190, custom color mapping is performed. In various exemplary embodiments, the color mapping is performed using a optimized color map, as described in greater detail below. Then, operation continues to step S195.

At step S195, operation of the method ends. The data is processed, and is ready for date compression.

It should be noted that one or more of steps S120-S150 may be omitted. Similarly, one of steps S160 and S180, with the respective associated steps S170 and S190, may be omitted.

TABLE 1

| Red | Green | Blue | Colors | Bits |
|---|---|---|---|---|
| 2 | 2 | 2 | 8 | 3.0 |
| 3 | 3 | 2 | 18 | 4.2 |
| 3 | 4 | 3 | 36 | 5.2 |
| 4 | 5 | 3 | 60 | 5.9 |
| 5 | 6 | 3 | 90 | 6.5 |
| 5 | 8 | 3 | 120 | 6.9 |
| 6 | 8 | 4 | 192 | 7.6 |
| 7 | 9 | 4 | 252 | 8.0 |

Table 1 shows exemplary embodiments of user-defined custom color maps. In the Table 1, the "bits" number is used to indicate the approximate bit depth per pixel before compression. As shown in Table 1, the 8 different color maps range from 8 colors (3 bits/pixel) to 252 colors (approximately 8 bits/pixel). Thus, by using a custom color map having less color levels, the data will have an increased number of zero entries, which contributes to increased compression ratio. In effect, reducing the number of available output colors increases the prediction probability of the statistical encoder incorporated into GIF or similar file formats and thus increases compression ratio.

Figure 3:
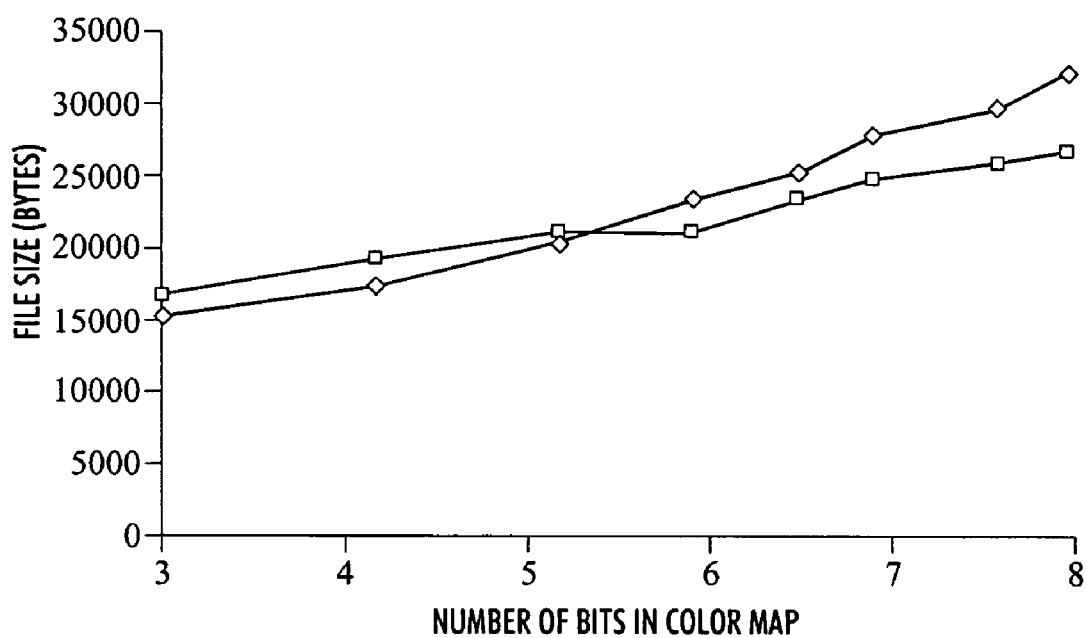
FIG. 3 shows an example of the size of a compressed image file as a function of bits in color maps.

FIG. 3 shows the general behavior of a compressed file size as a function of the bits of the color map. The two curves in FIG. 3 each represent a GIF file having a strong graphic/image content.

In FIG. 3, the x-axis indicates the bit depth of the files. Each file is in the 8-bit format, but only a subset of the possible 8-bit color map data is used and thus the compression ratio will increase. For example, when the file is processed according to the custom color map shown in the first row of Table 1 to a bit depth 3.0 with 8 colors (2 color levels in each of red, green and blue), the file has a large subset of data with prediction error of zero. The existence of the large subset of zero entries will contribute to an increased compression ratio during subsequent data compression.

As shown in FIG. 3, the file size indicated in the y-axis decreases with the numbers of colors in the color map. The file size as a function of color map indicates that the file has a different compression ratio as a function of the color map.

In various exemplary embodiments, GIF compression ratio is increased by using tonal reproduction curves that increase contrast. Using tonal reproduction curves (TRC) increases the number of correlated entries in the GIF file, thus leading to increased compression ratio in subsequent GIF compression.

In various exemplary embodiments, symmetric TRC is used. For example, a symmetric TRC is used to map all values below bit value 32 to black and all values above bit value 223 to white. The rest of the bit value range is a linear mapping between black and white. In various other exemplary embodiments, non-symmetric TRCs are used. For example, a non-symmetric TRC is used to map all pixel values below bit value 64 to black.

In various exemplary embodiments, the selection of parameters determines whether symmetric or non-symmetric TRC should be used. For example, the selection of parameters may determine that non-symmetric TRC be used for files containing text documents. On the other hand, the selection of parameters may determine that symmetric TRC be used for files containing presentation documents, such as PowerPoint™ presentation documents.

Figure 4:
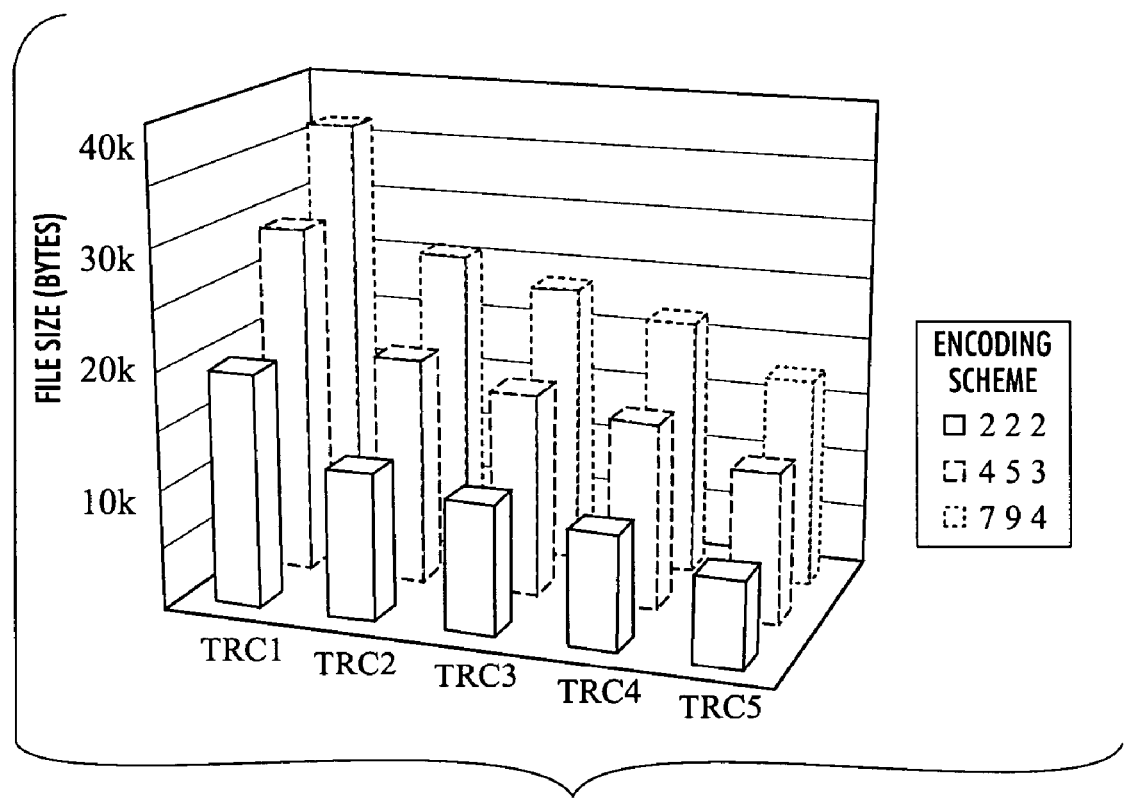
FIG. 4 shows file sizes for a scanned page as a function of color encoding and enhancement TRC.
Figure 5:
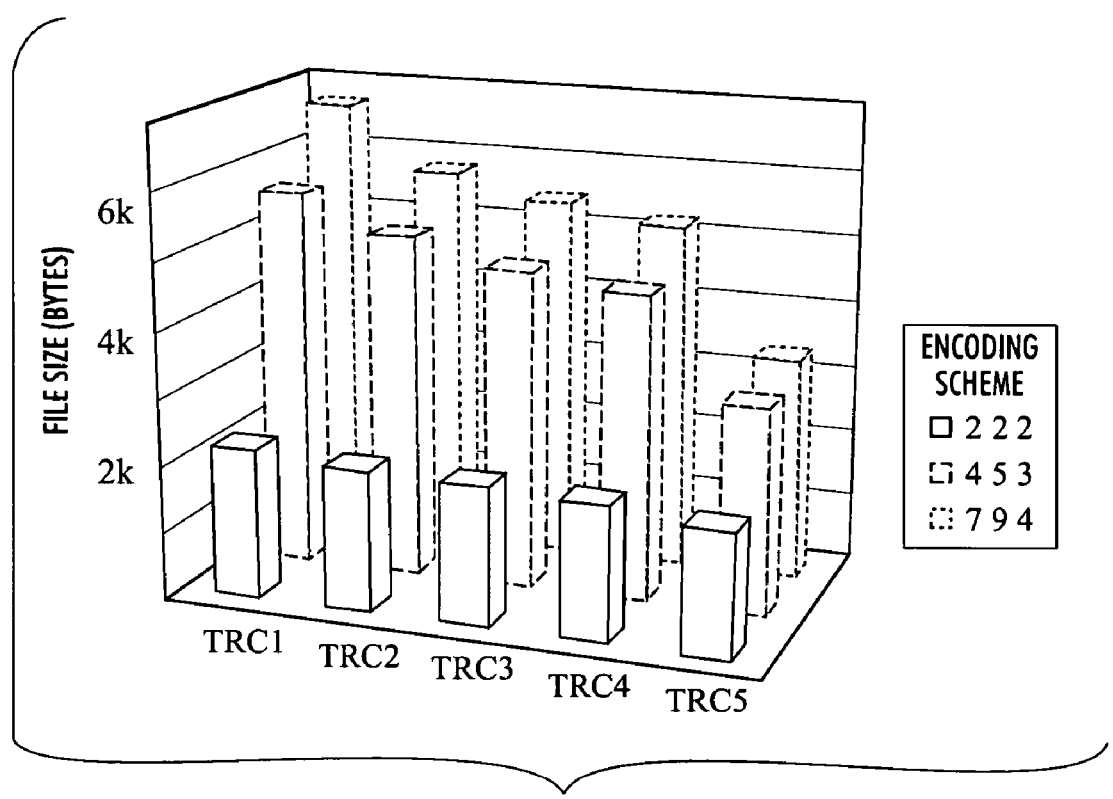
FIG. 5 shows file sizes for a Word™ document as a function of color encoding and enhancement TRC.

In various exemplary embodiments, both contrast enhancement via TRC and color mapping using custom color maps are used in processing GIF files. FIGS. 4 and 5 show the combined effect of changing contrast and color map. As shown in FIGS. 4 and 5, three different color mapping schemes are used, labeled "222" (8 levels), "453" (60 levels) and "794" (252 levels), respectively. Five different TRCs are used, labeled "TRC1", "TRC2", "TRC3", "TRC4", and "TRC5", respectively.

As shown in FIG. 4, for a GIF file containing a scanned page, the size of the compressed GIF file is reduced from about 40K to about 20K if the number of color levels is reduced using a custom color table in the processing step from 252 levels to 8 levels. The size of the compressed GIF file is reduced from about 40K to about 15K if contrast is enhanced by changing the tonal reproduction curve from TRC 1 to TRC 5. The size of the compressed GIF file is reduced from about 40K to about 7K if both the 8-level custom color map and the tonal reproduction curve TRC 5 are used in the processing step.

As shown in FIG. 5, for a GIF file containing a Word™ document, the size of the compressed file decreases when the file is processed using a custom color map with reduced number of color levels, and/or when the file is processed with contrast enhancement. For example, the size of the compressed file is reduced from over 6K to about 2K if the number of color levels is reduced in the processing from 252 levels to 8 levels. The size is reduced from over 6K to about 3K if the contrast is enhanced from TRC 1 to TRC 5.

In various exemplary embodiments, when establishing a selection of parameters, a small number of colors is used along with a steep TRC for a low zoom level (large reduction) to facilitate a user to have a quick browsing at the client. In various exemplary embodiments, a secondary adjustment of the TRC or the custom color map may be performed to increase or decrease the compression ratio.

Figure 6:
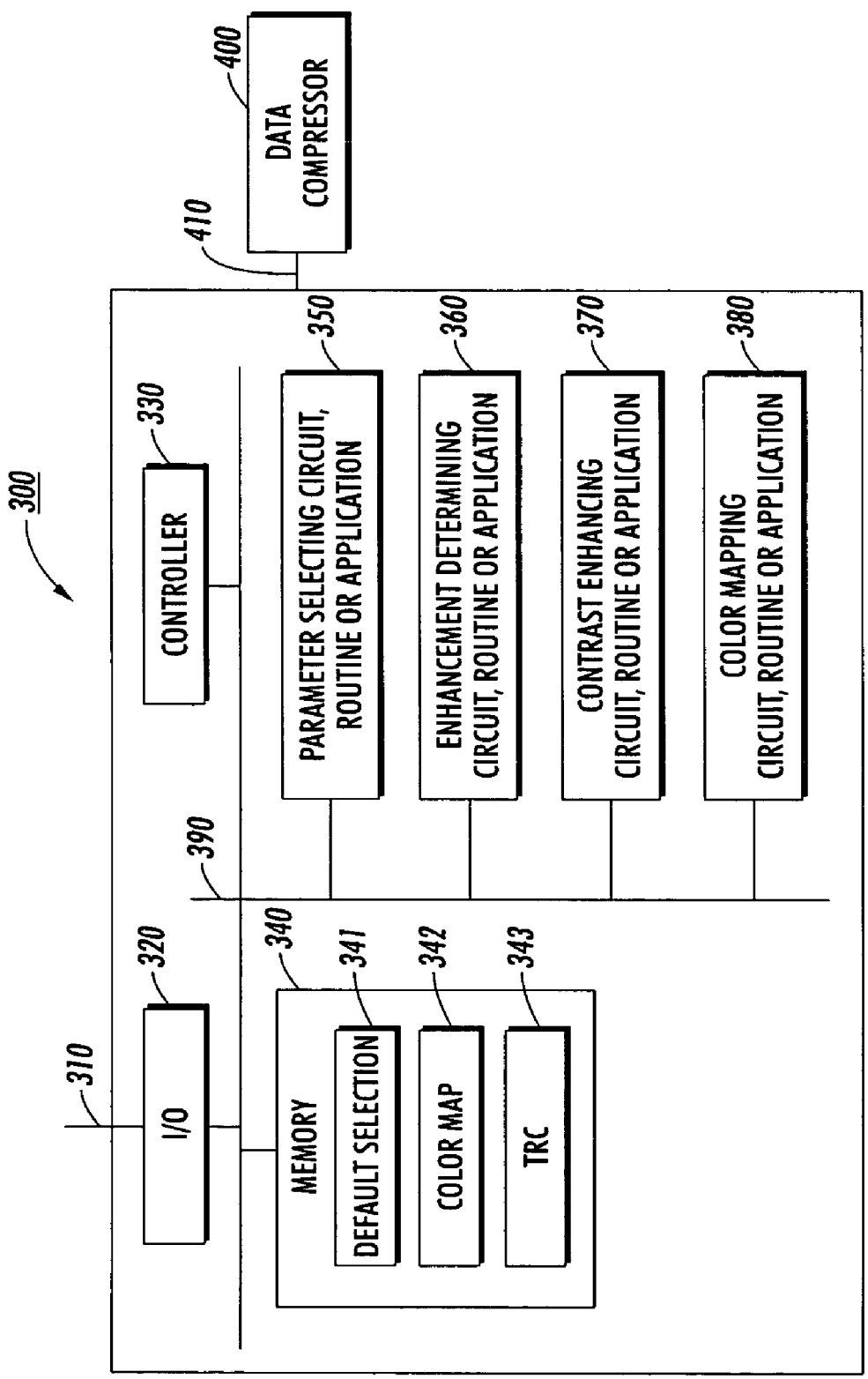
FIG. 6 is a functional block diagram of an exemplary embodiment of a data processing system according to this invention.

FIG. 6 is a functional block diagram of an exemplary embodiment of a data processing system according to this invention. As shown in FIG. 6, the data processing system 300 may reside in a server. In various exemplary embodiments, the data processing system 300 is connected to a data compressor 400.

As shown in FIG. 6, the data processing system 300 may include an input/output (I/O) interface 320, a controller 330, a memory 340, a parameter selecting circuit, routine or application 350, an enhancement determining circuit, routine or application 360, a contrast enhancing circuit, routine or application 370 and a color mapping circuit, routine or application 380, each interconnected by one or more control and/or data buses and/or application programming interfaces 390.

In various exemplary embodiments, the data processing system 300 is implemented on a programmable general purpose computer. However, the data processing system 300 can also be implemented on a special purpose computer, a programmed microprocessor or microcontroller and peripheral integrated circuit elements, an ASIC or other integrated circuits, a digital signal processor (DSP), a hard wired electronic or logic circuit, such as a discrete element circuit, a programmable logic device such as a PLD, PLA, FPGA or PAL, or the like. In general, any device capable of implementing a finite state machine that is in turn capable of implementing the flowchart shown in FIG. 2 can be used to implement the data processing system 300.

The input/output interface 320 interacts with the outside of the data processing system 300. In various exemplary embodiments, the input/output interface 320 may receive input from the outside, such as a network, via one or more links 310. The input/output interface 320 may output data for subsequent delivery or transmission via the one or more links 310.

The one or more links 310 may be direct connections, or may be implemented using a connection device such as a modem, a local area network, a wide area network, an intranet, the Internet, and any other distributed processing network, or any other known or later-developed connection device.

As shown in FIG. 6, the memory 340 includes a parameter default selection portion 341, a color map portion 342, and a TRC portion 343. The parameter default selection portion 341 stores default selections of parameters for clients. The parameter default selection portion 341 can also store parameters of various networks and display devices. The color map portion 342 stores various custom color maps for color quantization. The TRC portion 343 stores various tonal reproduction curves for contrast enhancement.

The memory 340 may also store any data and/or program necessary for implementing the functions of the data processing system 300. The memory 340 can be implemented using any appropriate combination of alterable, volatile, or non-volatile memory or non-alterable or fixed memory. The alterable memory, whether volatile or non-volatile, can be implemented using any one or more of static or dynamic RAM, a floppy disk and a disk drive, a writable or rewritable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or a DVD-ROM disk and disk drive or the like.

In the exemplary embodiments of the data processing system 300 shown in FIG. 6, the parameter selecting circuit, routine or application 350 determines a selection of parameters. In various exemplary embodiments, the parameter selecting circuit, routine or application 350 determines the selection of parameters based on a user's instructions, a default selection stored in the memory 340, and/or detected features of the network, the client and/or the document type. In various exemplary embodiments, a detection may be made by detecting a network/device type, coupled with parameters stored for that network/device type. In various exemplary embodiments, different documents are processed differently. For example, a Word™ document is processed differently from a PowerPoint™ document.

The enhancement determining circuit, routine or application 360 determines whether contrast enhancement and color mapping are needed based on the selection of parameters. The contrast enhancing circuit, routine or application 370 enhances contrast. In various exemplary embodiments, the contrast enhancing routine or application 370 performs contrast enhancement using a tonal reproduction curve stored in the memory 340, based on the selection of parameters.

The color mapping circuit, routine or application 380 performs color mapping. In various exemplary embodiments, the color mapping circuit, routine or application 380 performs color mapping using a color map stored in the memory 340 based on the selection of parameters.

In various exemplary embodiments, the default selections stored in the parameter default selection portion 341, the color maps stored in the color map portion 342, and the toner reproduction curves stored in the TRC portion 343 can be edited, revised or updated.

In operation of the exemplary embodiments of the data processing system 300 shown in FIG. 6, the input/output interface 320, under control of the controller 330, receives input from a client via the one or more links 310. The parameter selecting circuit, routine or application 350, under control of the controller 330, determines a selection of parameters for data processing. The enhancement determining circuit, routine or application 360, under control of the controller 330, determines whether contrast enhancement and color mapping are required based on the selection of parameters. The contrast enhancing, routine or application 370 under control of the controller 330, performs contrast enhancement, if contrast enhancement is determined to be required by the enhancement determining circuit, routine or application 360. The color mapping circuit, routine or application 380, under control of the controller 330, performs color mapping, if color mapping is determined as required by the enhancement determining circuit, routine or application 360.

The parameter selecting circuit, routine or application 350, under control of the controller 330, may decide whether adjustment to the selection of parameters is necessary. The parameters selecting circuit, routine or application 350 may determine another selection of parameters if it is determined that adjustment to the selection of parameters is necessary.

The processed data, under control of the controller 330, may be sent to the data compressor 400, via a link 410, as shown in FIG. 6. In various exemplary embodiments, the compressed data, under control of the controller 330, is returned to the data processing system 300 and sent to the user at a client display device via the one or more links 310. In various other exemplary embodiments, the compressed data is sent to the user from the data compressor 400 without returning to the data processing system 300.

In various exemplary embodiments, the data compressor 400 is integrated with the data processing 300. In such exemplary embodiments, the link 410 is not necessary. Instead, the data compressor 400 is a component of the data processing system 300, connected to the data bus 390.

While particular embodiments have been described, alternatives, modifications, variations and improvements may be implemented within the spirit and scope of the invention.

What is claimed is:

1. A system for processing an image for compression and transmission, the image having data associated therewith, the data having one or more data values and color levels, the data being subsequently compressed and transmitted, the system comprising:
   a parameter selecting circuit, routine or application that determines one or more parameters for processing data associated with the image, the parameters associated with at least one of data compression and data transmission of the image,
   wherein the parameter selecting circuit, routine or application determines at least one of a bandwidth of a network for subsequent data transmission, a transmission speed of the network, a data display zoom level, and a compressed image size;
   a data enhancing circuit, routine or application that enhances a contrast of the data values, prior to compressing the processed data, based on the one or more parameters determined; and
   a data compression circuit, routine or application that compresses data processed by the data processing circuit,
   wherein the data processing circuit, routine or application increases a data compression ratio in the data compression.

2. The system according to claim 1, wherein the parameter selecting circuit, routine or application determines a compressed image size, and the data enhancing circuit, routine or application enhances the contrast of the data values based on the determined compressed image size.

3. The system according to claim 1, wherein the data enhancing circuit, routine or application reduces a number of color levels of the data values having enhanced contrast.

4. The system according to claim 1, wherein the parameter selecting circuit, routine or application determines a data display zoom level, and the data enhancing circuit, routine or application enhances the contrast of the data values based on the determined data display zoom level.

5. The system according to claim 3, wherein the data enhancing circuit, routine or application processes losslessly compressed color mapped data.

6. The system according to claim 5, the losslessly compressed color mapped data being graphics interchange format (GIF) data.

7. The system according to claim 1, wherein the data enhancing circuit, routine or application processes the data associated with the image using tonal reproduction curves to increase a number of correlated entries in the data, thereby increasing a data compression ratio in subsequent data compression.

8. The system according to claim 7, wherein different tonal reproduction curves are used for different levels of compression.

9. The system according to claim 8, wherein different types of tonal reproduction curves are used for different document types.

10. The system according to claim 7, wherein different types of tonal reproduction curves are used for different document types.

11. A computer-readable medium storing a computer program product tangibly embodying a program of instructions for processing an image for compression and transmission, the image having data associated therewith, the data having one or more data values and color levels, the instructions, when executed by a processor, causing the processor to perform operations comprising:
   determining one or more parameters associated with at least one of data compression and data transmission of the image;
   processing data associated with the image by enhancing a contrast of the data values, prior to compressing the processed data, based on the one or more parameters determined, wherein processing the data associated with the image comprises using tonal reproduction curves to increase a number of correlated entries in the data, thereby increasing a data compression ratio in subsequent data compression; and
   compressing the processed data associated with the image.

12. The computer-readable medium according to claim 11, the operations further comprising reducing the number of color levels of the data values having enhanced contrast.

13. The computer-readable medium according to claim 11, wherein determining one or more parameters comprises determining at least one of a bandwidth of a network for subsequent data transmission, a transmission speed of the network, a data display zoom level, and a compressed image size.

14. The computer-readable medium according to claim 11, wherein determining one or more parameters comprises determining a data display zoom level, and wherein processing data associated with the image enhances the contrast of the data values based on the determined data display zoom level.

15. The computer readable medium according to claim 12, wherein reducing the number of the color levels comprises processing losslessly compressed color mapped data.

16. The computer readable medium according to claim 15, the losslessly compressed color mapped data being graphics interchange format (GIF) data.

17. The computer-readable medium according to claim 11, wherein different tonal reproduction curves are used for different levels of compression.

18. The computer-readable medium according to claim 17, wherein different types of tonal reproduction curves are used for different document types.

19. The computer-readable medium according to claim 11, wherein different types of tonal reproduction curves are used for different document types.

20. The computer-readable medium according to claim 12, wherein reducing the number of the color levels comprises performing color mapping to reduce the number of the color levels.

21. The computer-readable medium according to claim 11, wherein determining one or more parameters comprises determining a compressed image size, and wherein processing data associated with the image enhances the contrast of the data values based on the determined compressed image size.

22. A method for processing an image for compression and transmission, the image having data associated therewith, the data having one or more data values and color levels, the method comprising: using a controller, the controller:
  determining one or more parameters associated with at least one of data compression and data transmission of the image;
  processing data associated with the image by enhancing a contrast of the data values, prior to compressing the processed data, based on the one or more parameters determined, wherein processing the data associated with the image comprises using tonal reproduction curves to increase a number of correlated entries in the data, thereby increasing a data compression ratio in subsequent data compression; and
  compressing the processed data associated with the image.

23. The method of claim 22, further comprising reducing a number of the color levels of the data values having enhanced contrast.

24. The method of claim 22, wherein determining one or more parameters comprises determining at least one of a bandwidth of a network for subsequent data transmission, a transmission speed of the network, a data display zoom level, and a compressed image size.

25. The method of claim 22, wherein determining one or more parameters comprises determining a data display zoom level, and wherein processing data associated with the image enhances the contrast of the data values based on the determined data display zoom level.

26. The method of claim 23, wherein reducing the number of the color levels comprises processing losslessly compressed color mapped data.

27. The method of claim 26, the losslessly compressed color mapped data being graphics interchange format (GIF) data.

28. The method of claim 22, wherein different tonal reproduction curves are used for different levels of compression.

29. The method of claim 28, wherein different types of tonal reproduction curves are used for different document types.

30. The method of claim 29, wherein determining one or more parameters comprises determining a data display zoom level, and wherein processing data associated with the image enhances the contrast of the data values based on the determined data display zoom level.

31. The method of claim 29, wherein determining one or more parameters comprises determining a compressed image size, and wherein processing data associated with the image enhances the contrast of the data values based on the determined compressed image size.

32. The method of claim 22, wherein different types of tonal reproduction curves are used for different document types.

33. The method of claim 23, wherein reducing the number of the color levels comprises performing color mapping to reduce the number of the color levels.

34. The method of claim 22, wherein determining one or more parameters comprises determining a compressed image size, and wherein processing data associated with the image enhances the contrast of the data values based on the determined compressed image size.

* * * * *